(12) United States Patent
Sakabe

(10) Patent No.: US 7,201,069 B2
(45) Date of Patent: Apr. 10, 2007

(54) ANGLE SENSOR

(75) Inventor: Takashi Sakabe, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/900,378

(22) Filed: Jul. 28, 2004

(65) Prior Publication Data

US 2005/0022613 A1  Feb. 3, 2005

(30) Foreign Application Priority Data

Aug. 1, 2003  (JP) ............................. 2003-285320

(51) Int. Cl.
*G01L 3/02* (2006.01)
(52) U.S. Cl. ................................. 73/862.31
(58) Field of Classification Search ............. 73/862.31; 701/41; 324/207.18, 207.25, 207.2, 207.21; 33/1 N, 1 PT; 180/443, 446, 444
See application file for complete search history.

(56) References Cited

U.S. PATENT DOCUMENTS

| | | | | |
|---|---|---|---|---|
| 5,025,563 A | * | 6/1991 | Rennerfelt | 33/1 N |
| 5,032,750 A | * | 7/1991 | Hayashi | 310/83 |
| 5,930,905 A | * | 8/1999 | Zabler et al. | 33/1 PT |
| 6,158,132 A | * | 12/2000 | Kofink et al. | 33/1 PT |
| 6,250,420 B1 | * | 6/2001 | Brenner et al. | 180/443 |
| 6,720,762 B2 | * | 4/2004 | Okumura | 324/207.21 |
| 6,745,116 B2 | * | 6/2004 | Takuma et al. | 701/41 |
| 6,804,888 B2 | * | 10/2004 | Nishikawa et al. | 33/1 PT |
| 6,810,590 B2 | * | 11/2004 | Sano | 33/1 PT |
| 6,828,783 B2 | * | 12/2004 | Schroter et al. | 324/207.25 |
| 6,848,187 B2 | * | 2/2005 | Ito et al. | 33/1 PT |
| 6,857,981 B2 | * | 2/2005 | Hori et al. | 475/149 |
| 6,901,816 B2 | * | 6/2005 | Yamaguchi | 73/862.326 |
| 6,988,421 B2 | * | 1/2006 | Tokumoto | 73/862.333 |

FOREIGN PATENT DOCUMENTS

JP  2000-180113  6/2000

* cited by examiner

*Primary Examiner*—Michael Cygan
*Assistant Examiner*—Octavia Davis
(74) *Attorney, Agent, or Firm*—Finnegan, Henderson, Farabow, Garrett & Dunner, L.L.P.

(57) ABSTRACT

An angle sensor includes a first gear configured to be concentrically mounted to a rotor, a second gear configured to mesh with the first gear, and a first rotation angle detector configured to detect a rotation angle of the second gear, wherein the first rotation angle detector outputs absolute angle signals according to the rotation angle of the second gear, generates a first pulse based on rotation of the second gear, generates a second pulse having a different phase compared to the first pulse based on rotation of the second gear, generates a third pulse once per rotation of the second gear based on rotation of the second gear, varies each resolution of rotation angles of the first pulse, the second pulse, and the third pulse, and detects the rotation angle of the second gear in accordance with the resolution.

8 Claims, 7 Drawing Sheets

FIG.4

| OUTPUT RESOLUTION OF THE MAGNETIC SENSOR | | GEAR RATIO | | | | | |
|---|---|---|---|---|---|---|---|
| (bit) | (deg) | 22.5 | 11.25 | 5.625 | 2.8125 | 1.40625 | 0.703125 |
| 6 | 5.625 | 0.25 | 0.5 | 1 | 2 | 4 | 8 |
| 7 | 2.8125 | 0.125 | 0.25 | 0.5 | 1 | 2 | 4 |
| 8 | 1.40625 | 0.0625 | 0.125 | 0.25 | 0.5 | 1 | 2 |
| 9 | 0.703125 | 0.03125 | 0.0625 | 0.125 | 0.25 | 0.5 | 1 |
| 10 | 0.3515625 | 0.015625 | 0.03125 | 0.0625 | 0.125 | 0.25 | 0.5 |

UNIT : deg

FIG.5

| OUTPUT RESOLUTION OF THE MAGNETIC SENSOR | | GEAR RATIO | | | | | |
|---|---|---|---|---|---|---|---|
| (bit) | (deg) | 15 | 7.5 | 3.75 | 1.875 | 0.9375 | 0.46875 |
| 6 | 5.625 | 0.375 | 0.75 | 1.5 | 3 | 6 | 12 |
| 7 | 2.8125 | 0.1875 | 0.375 | 0.75 | 1.51 | 3 | 6 |
| 8 | 1.40625 | 0.09375 | 0.1875 | 0.375 | 0.75 | 1.5 | 3 |
| 9 | 0.703125 | 0.046875 | 0.09375 | 0.1875 | 0.375 | 0.75 | 1.5 |
| 10 | 0.3515625 | 0.0234375 | 0.046875 | 0.09375 | 0.1875 | 0.375 | 0.75 |

UNIT : deg

FIG.6

| OUTPUT RESOLUTION OF THE MAGNETIC SENSOR | | GEAR RATIO | | | | | |
|---|---|---|---|---|---|---|---|
| (bit) | (deg) | 20 | 10 | 5 | 2.5 | 1.25 | 0.625 |
| 6 | 5.625 | 0.28125 | 0.5625 | 1.125 | 2.25 | 4.5 | 9 |
| 7 | 2.8125 | 0.140625 | 0.28125 | 0.5625 | 1.125 | 2.25 | 4.5 |
| 8 | 1.40625 | 0.0703125 | 0.140625 | 0.28125 | 0.5625 | 1.125 | 2.25 |
| 9 | 0.703125 | 0.03515625 | 0.0703125 | 0.140625 | 0.28125 | 0.5625 | 1.125 |
| 10 | 0.3515625 | 0.017578125 | 0.03515625 | 0.0703125 | 0.140625 | 0.28125 | 0.5625 |

UNIT : deg

ANGLE SENSOR

CROSS REFERENCE TO RELATED APPLICATIONS

This application is based upon and claims the benefit of priority from prior Japanese Patent Application P2003-285320 filed on Aug. 1, 2003; the entire contents of which are incorporated by reference herein.

BACKGROUND OF THE INVENTION

1. Field of the Invention

The present invention relates to an angle sensor, especially a steering angle sensor for detecting a steering angle of a rotor such as a steering of a vehicle.

2. Description of the Related Art

With a vehicular steering shaft of the related art, an absolute steering angle sensor or a relative steering angle sensor has heretofore been used as a steering angle sensor available to detect a steering angle of a rotor.

The absolute steering angle sensor of the related art is comprised of a first gear rotatable in connection with a steering shaft, a second gear in mesh with the first gear, and a third gear. A gear ratio (a ratio in a number of teeth) of the second gear to the first gear differs from a gear ratio of the third gear to the first gear. In order to measure rotation angles of the second and third gears, magnetic sensors measure rotation angles of magnets mounted to the second and third gears, respectively. The rotation angles of the first gear and the steering shaft can be obtained depending upon the rotation angles of the second and third gears.

Further, a relative steering angle sensor described in Japanese Patent Provisional Publication No. 2000-180113 has heretofore been known in the art.

Technology disclosed in Japanese Patent Provisional Publication No. 2000-180113 includes a multiple-pole magnetized ring with an N-pole and S-pole being alternately located along a circumferential periphery. A magnetic reluctance element detects variation in a magnetic field occurring during rotation of the magnetized ring, thereby producing an A-phase pulse (a first pulse) and a B-phase pulse (a second pulse) resulting from fluctuation in the magnetic field. Additionally, a monopole-magnetized portion is provided on one area of the circumferential periphery. A hole-effect IC detects the monopole-magnetized portion, thereby producing a Z-phase pulse (a third pulse).

Depending upon the three-phase (A-, B- and Z-phases) pulse signals described above, a rotation angle, a rotation direction and a reference position of the steering shaft are detected. As a result, a steering angle of the steering shaft is measured.

That is, with a host system applied with the three-phase pulse signals, the rotation angle and rotation direction are detected in accordance with the A-phase pulse and B-phase pulse. Additionally, depending upon the Z-phase pulse, a neutral position (a position at which the steering shaft is oriented in a straight-running direction) is detected.

However, the relative steering angle sensors of the related art are formed in different structures depending upon specifications such as resolutions (minimal steering angles that can be detected) of detected steering angles. That is, depending upon the specifications, the magnetized rings are different in size and have different number of magnetized poles while the magnetic sensors must be mounted in different positions, resulting in non-standardized status. For this reason, no component parts are commoditized and thus, a need arises for preparing different component parts.

Further, with the absolute steering angle sensor and the relative steering angle sensor, packages (storage cases) and detecting structures (including magnetic sensors and magnets) are not commoditized. This results in a need for preparing different packages and detecting structures, resulting in an issue with an increase in the number of component parts.

The present invention aims to address such a related art issue and has an object to provide a steering angle sensor by which component parts can be standardized. As a result, the present invention is able to properly comply with various situations depending upon specifications.

SUMMARY OF THE INVENTION

An aspect of the present invention inheres in an angle sensor includes a first gear configured to be concentrically mounted to a rotor, a second gear configured to mesh with the first gear, and a first rotation angle detector configured to detect a rotation angle of the second gear, wherein the first rotation angle detector outputs absolute angle signals according to the rotation angle of the second gear, generates a first pulse based on rotation of the second gear, generates a second pulse having a different phase compared to the first pulse based on rotation of the second gear, generates a third pulse once per rotation of the second gear based on rotation of the second gear, varies each resolution of rotation angles of the first pulse, the second pulse, and the third pulse, and detects the rotation angle of the second gear in accordance with the resolution.

BRIEF DESCRIPTION OF THE DRAWINGS

FIG. 4 is a first table schematically showing the relationship between the gear ratio between the first gear and the second gear and the output resolution of the magnetic sensor.

FIG. 5 is a second table schematically showing the relationship between the gear ratio between the first gear and the second gear and the output resolution of the magnetic sensor.

FIG. 6 is a third table schematically showing the relationship between the gear ratio between the first gear and the second gear and the output resolution of the magnetic sensor.

DETAILED DESCRIPTION OF EMBODIMENTS

Figure 1:
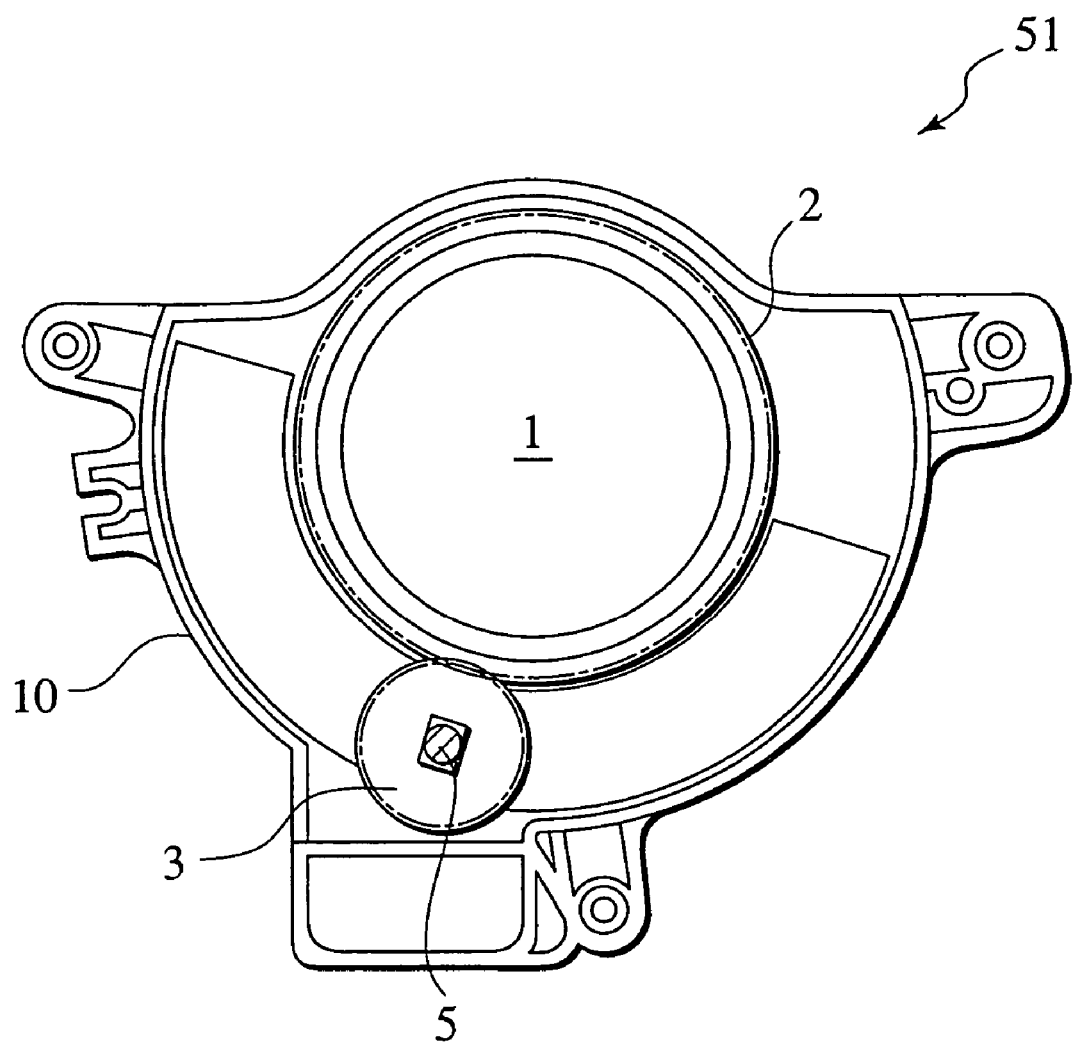
FIG. 1 is a view schematically showing the steering angle sensor of the first embodiment of the present invention.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

In the following description specific details are set fourth, such as specific materials, process and equipment in order to provide thorough understanding of the present invention. It will be apparent, however, to one skilled in the art that the present invention may be practiced without these specific details. In other instances, well-known manufacturing materials, process and equipment are not set fourth in detail in order not unnecessary obscure the present invention.

Hereunder, embodiments of the present invention will be described with reference to the accompanying drawings. As shown in FIG. 1, a steering angle sensor 51 of a first embodiment is mounted in a storage case 10 and measures a steering angle of a steering shaft (rotor) 1 mounted in a vehicle. The steering angle sensor 51 includes a first gear 2 concentrically mounted to the steering shaft 1, and a second gear 3 in mesh with the first gear 2.

In general, the second gear 3 is made smaller in diameter than the first gear 2. That is, the second gear 3 has a less number of gear teeth than the first gear 2. For instance, the first gear has a number of gear teeth of "135"; and the second gear 3 has a number of gear teeth of "48".

Figure 2:
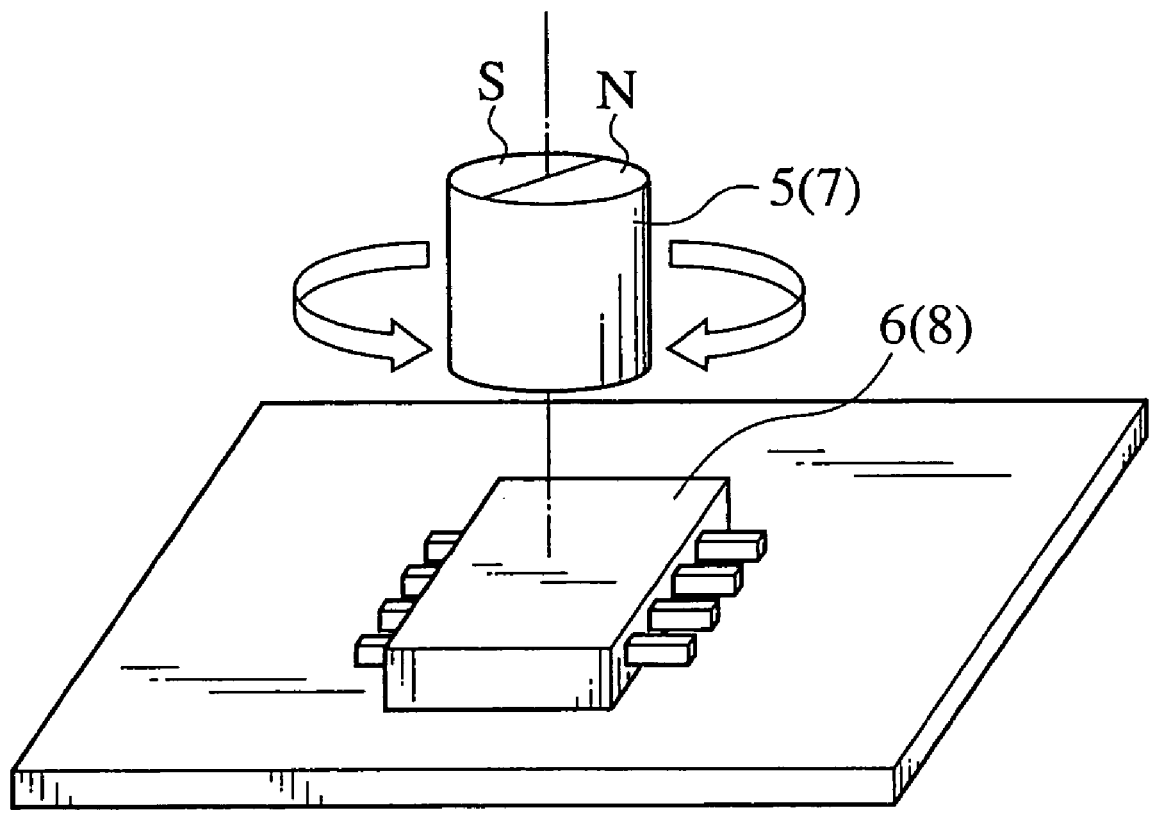
FIG. 2 is a view schematically showing the magnetic sensor mounted onto the stationary side in opposition to the magnet.

A first rotation angle detector includes a two-pole magnetized magnet 5 and a magnetic sensor 6, as shown in FIG. 2. Mounted onto a central area of the second gear 3 is the two-pole magnetized magnet 5. As shown in FIG. 2, the magnetic sensor 6 is mounted onto a stationary side in opposition to the magnet 5 in an axial direction of the second gear 3 to detect an orientation of a magnetic field generated by the magnet 5.

Figure 3:
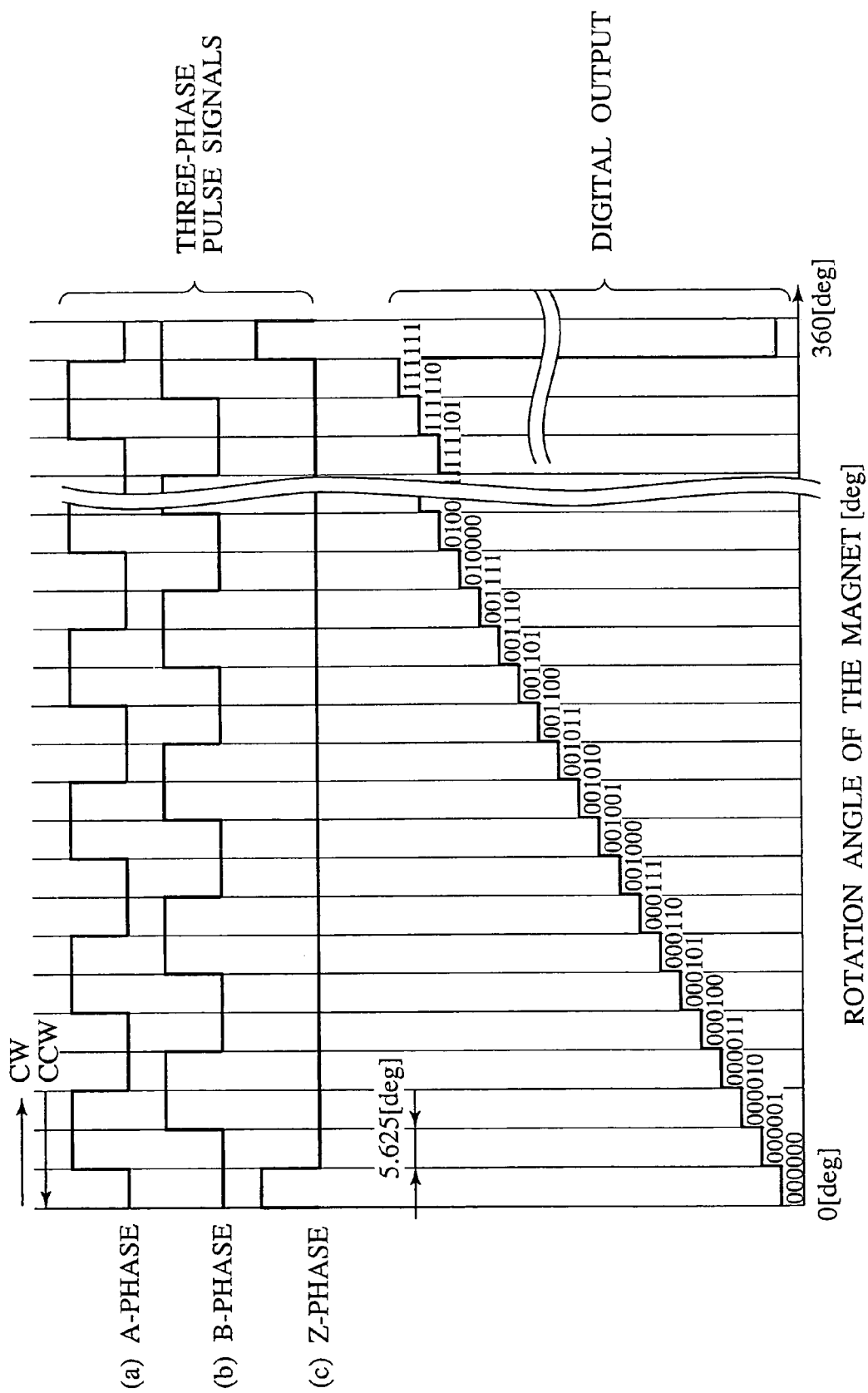
FIG. 3 is a time chart schematically showing the absolute angle signals and the three-phase pulse signals.

As shown in FIG. 3, the magnetic sensor 6 outputs absolute angle signals and three-phase pulse signals. That is, with the presently filed embodiment, an output resolution of the magnetic sensor is 6 bits, i.e., in 64 divisions of "000000" to "111111" in binary number, and using such output resolution (360°/64=5.625°) enables detection of a rotation angle of the second gear 3.

Further, as shown in FIGS. 3 (a) to (c), based on rotation of the second gear 3, three-phase pulse signals of phases A, B and Z are outputted and, hence, a host system (not shown) connected to the steering angle sensor 51 in a subsequent stage is able to obtain the rotation angle of the second gear 3 in response to the pulse signals in A- and B-phase pulse signals. Also, depending upon the presence of the A-phase pulse and the B-phase pulse with the phase difference at 90 degrees with respect to one another, it is possible to detect a rotation direction, i.e., whether the rotation direction is clockwise (CW) or counter-clockwise (CCW). Additionally, the host system is able to detect a neutral position in response to the Z-phase pulse.

Accordingly, the host system responds to the three-phase pulse signals and is able to calculate the steering angle of the steering shaft 1.

Now, description is made of the output resolution of the three-phase pulse signals outputted from the magnetic sensor 6. In normal practice, the output resolution is set to a value in the order of 8 bits to 10 bits. For instance, in case of the output resolution of 6 bits (in binary 6 digits), as set forth above, the output resolution is 5.625°. Similarly, in case of 10 bits (in binary 10 digits), the output resolution is 0.3515625°.

Further, as shown in FIG. 4, adjusting a gear ratio between the first gear 2 and the second gear 3 enables the resolution of the steering shaft 1 to be determined.

In FIG. 4, if the gear ratio between the first gear 2 and the second gear 3 is "5.625" and the output resolution of the magnetic sensor 6 is 6 bits, then, the resolution as a result of detecting the steering angle of the steering shaft 1 takes a value of 1°. That is, if the resolution of the magnetic sensor 6 is set to 6 bits, the rotation angle of the second gear 3 can be measured by a unit of "5.625°". The rotation angle of "5.625°" of the second gear 3 corresponds to the rotation angle of "1°" of the first gear 2 and, thus, the resolution of the steering shaft 1 can be set to a value of "1°".

Even if the second gear 3 is standardized in size, suitably altering the output resolutions of the magnetic sensors 6, 8 enables the resolution, resulting from detection of the steering angle of the steering shaft 1, to be set to a desired numeric value. For instance, as shown in FIG. 4, suppose that the gear ratio between the first gear 2 and the second gear 3 is "5.625" and the output resolution of the magnetic sensor 6 is 7 bits, the resolution of the steering shaft 1 can be set to a value of "0.5°" and the steering angle of the steering shaft 1 can be detected at a higher precision than the output resolution resulting from 6 bits.

That is, with the second gear 3, by which a desired gear ratio is provided, being preliminarily determined, as for the rest, suitably selecting the output resolution of the magnetic sensor 6 in a range from 6 to 10 bits provides an ability of obtaining a desired resolution of the steering shaft 1, making it possible to use common component parts for thereby setting the resolution to a proper value satisfying specifications of a variety of vehicles.

If the output resolution of the magnetic sensor 6 takes a value of integral multiple of the gear ratio between the first gear 2 and the second gear 3, or if the gear ratio between the first gear 2 and the second gear 3 takes a value of integral multiple of the resolution of the magnetic sensor 6, then, the resolution of the steering shaft 1 can be easily determined. As shown in FIG. 4, by choosing the gear ratios between the first gear 2 and the second gear 3 to lie at values of 22.5, 11.25, 5.625, 2.8125, 1.40625 and 0.703125, respectively, the resolution of the steering shaft 1 can be easily set to respective numeric values such as "1°", "2°" and "0.5°" and a desired resolution can be easily.

Also, as alternative other than FIG. 4, for instance, setting the output resolution of the magnetic sensor 6 and the gear ratio between the first gear 2 and the second gear 3, in a manner as shown in FIGS. 5 and 6, provides an ease of setting the resolution of the steering shaft 1.

In such a way, with the steering angle sensor 51 of the presently filed embodiment, by incorporating the second gear 3 in the storage case 10 and suitably altering the resolution of the three-phase pulse signals outputted from the magnetic sensor 6 that detects the rotation angle of the second gear 3, the resolution of the steering shaft 1 can be set to a desired value.

Accordingly, even in case of using the same storage case 10, the same gear (second gear 3) and the same detection means (magnet and magnetic sensor), adjusting the resolution of the steering shaft 1 enables a desired resolution of the steering shaft 1 to be obtained.

As a result, no need arises for making design change, in terms of hardware, that includes altering the magnetized ring in size and number of magnetized poles in dependence on the resolution of the steering shaft 1, as required in the related art, and the storage case 10 of the same size can be used, thereby achieving reduction in the number of component parts while providing simplified assembling work.

Further, adjusting a ratio between the output resolution of the magnetic sensor 6 and the gear ratio allows the resolution of the steering shaft 1 to have an integer or finite decimal, enabling a detecting precision of the steering angle to be improved.

Figure 7:
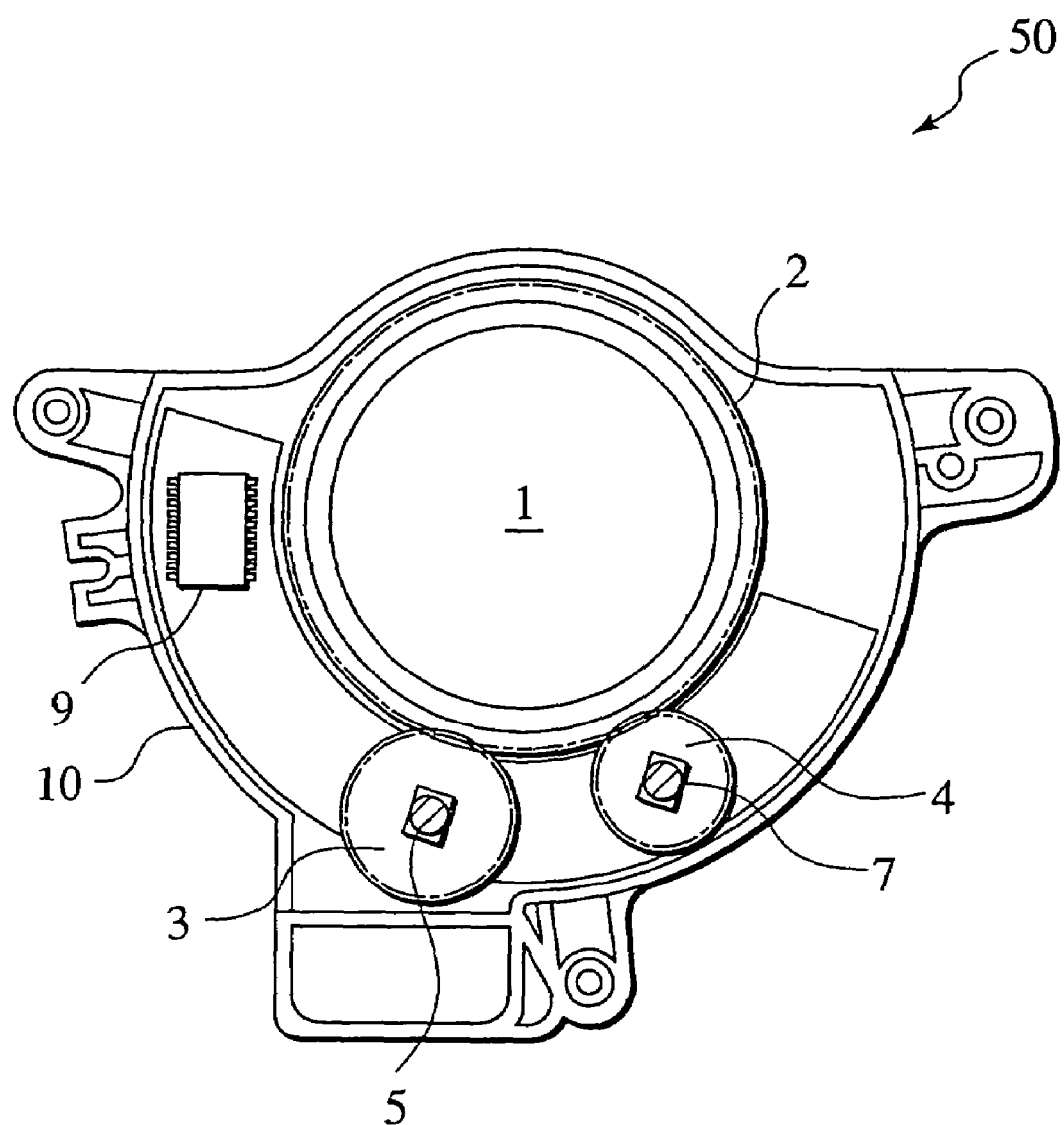
FIG. 7 is a view schematically showing the steering angle sensor of the second embodiment of the present invention.

Next, a second embodiment of the present invention is described. As shown in FIG. 7, a steering angle sensor 50 is mounted inside the storage case 10 to measure the steering angle of the steering shaft (rotary shaft) 1 mounted on the vehicle and includes the second gear 2 concentrically mounted onto the steering shaft 1, the second gear 3 in mesh with the first gear 2, and a third gear 4.

In general, the second gear 3 is smaller in diameter than the first gear 2, and the third gear 4 is smaller in diameter than the second gear 3. That is, the second gear 3 has a less number of teeth than the first gear 2. For instance, suppose that the number of teeth of the first gear 2 is "135", the number of teeth of the second gear 3 is "48" and the number of teeth of the third gear 4 is "34".

Further, a second rotation angle detector includes a two-pole magnetized magnet 7 and a magnetic sensor 8 as shown in FIG. 2. The two-pole magnetized magnet 5 is mounted to the central area of the second gear 2. Likewise, a two-pole magnetized magnet 7 is mounted onto a central area of the third gear 4. Additionally, like in a manner as shown in FIG. 2, the magnetic sensor 6 is mounted onto the stationary side in opposition to the magnet 5 in the axial direction of the second gear 3 for detecting the orientation of the magnetic field generated by the magnet 5. Similarly, a magnetic sensor 8 is mounted onto the stationary side in opposition to the magnet 7 in an axial direction of the third gear 4 for detecting an orientation of a magnetic field generated by the magnet 7. The magnetic sensor detects variation in a magnetic field occurring during rotation of the magnetized ring, thereby producing another A-phase pulse (a fourth pulse) and another B-phase pulse (a fifth pulse) resulting from fluctuation in the magnetic field. Additionally, a monopole-magnetized portion is provided on one area of the circumferential periphery. A hole-effect IC detects the monopole-magnetized portion, thereby producing a Z-phase pulse (a sixth pulse).

Furthermore, as shown in FIG. 7, disposed in the vicinity of a side area of the steering shaft 1 is a microcomputer (controller) 9 that calculates an absolute steering angle of the steering shaft 1 in dependence on the rotation angles of the second and third gears 3, 4.

Figure 8:
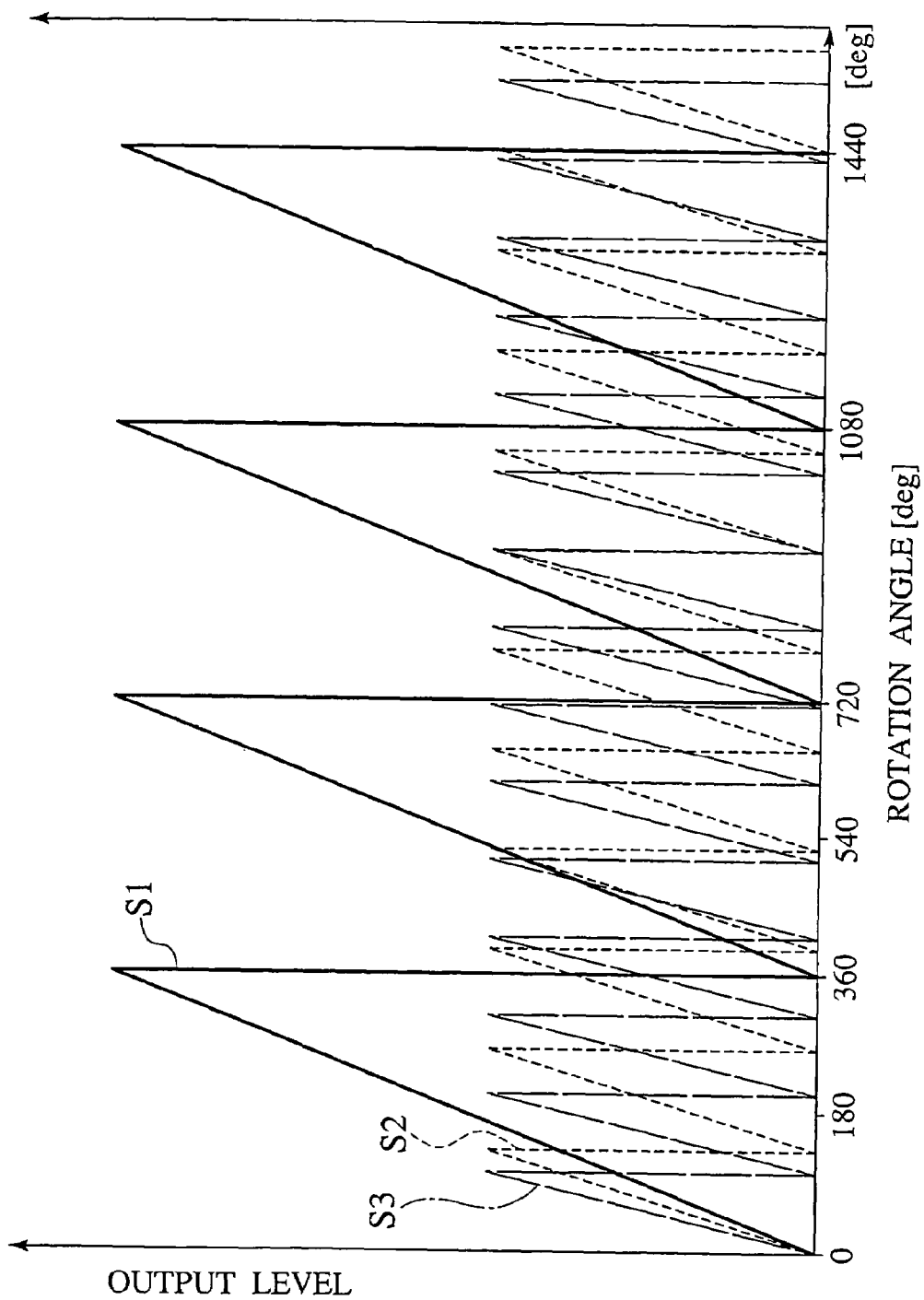
FIG. 8 is a graph schematically showing the relationship between the steering angle of the steering shaft and the rotation angles of the respective gears.

FIG. 8 is a characteristic view illustrating the relationship between the steering angle of the steering shaft 1 and the rotation angles of the respective gears (first to third gears). Hereinafter, description is made of a sequence of obtaining the absolute steering angle of the steering shaft 1 based on the rotation angles of the second and third gears 3, 4 measured by the respective magnetic sensors 6, 8.

A kinked line S1 shown in FIG. 8 represents variation in the rotation angle of the steering shaft 1; a kinked line S2 designates variation in the rotation angle of the second gear 3; and a kinked line S3 designates variation in the rotation angle of the third gear 4.

The steering shaft 1, mounted on the vehicle, normally rotates fours turns as a whole. That is, an entire steering angle lies in a value ranging from approximately 0° to 1440°. As set forth above, since the number of teeth of the first gear 2 is "135" and the number of teeth of the second gear 3 is "48", the gear ratio of the second gear 3 (a first gear ratio) is 135/48=2.8125. Likewise, since the number of gear teeth of the third gear 4 is chosen to be "34", the gear ratio of the third gear 4 (a second gear ratio) is 135/34=3.97. In other word, in one period of a triangular waveform S1 shown in FIG. 8, there are 2.8125 pieces of triangular waveforms S2 and 3.97 pieces of triangular waveforms S3.

A period of the waveform S1 and a period of the waveform S2 are set such that least common multiple between the period of the waveform S1 and the period of the waveform S2 lies at a value greater than 1440°. Accordingly, since there exists only one combination of two values, e. g., an angle (value of the kinked line S2) of the second gear 3, detected by the magnetic sensor 6, and an angle (value of the kinked line S3) of the third gear 4, detected by the magnetic sensor 8, in an entire steering angle (ranging from 0° to 1440°), the absolute steering angle of the steering shaft 1 can be specified. The microcomputer 9 operates on procedure mentioned above to measure the absolute angle of the steering shaft 1, with measured result being outputted to the host system.

In such a way, the steering angle sensor 50 of the second embodiment can be accommodated in the same storage case 10 as that of the steering angle sensor 51 of the first embodiment set forth above. Also, since the steering angle sensor 50 can be structured with the microcomputer 9 and the third gear 4 that are additionally provided to the steering angle sensor 51, a variety of component parts can be standardized to be common to both the steering angle sensors 50 and 51. Consequently, this results in reduction in the number of component parts.

Further, the steering angle sensor 50 can be used both as the relative steering angle sensor and the absolute steering angle sensor. That is, the steering angle sensor 50 is able to output not only the three-phase pulse signals related to the second gear 3 but also the signals related to the angles of the second and third gears 3, 4. A variety of equipment installed on the vehicle include one that employs the three-phase pulse signals resulting from the relative steering angle sensor and the other that employs the signals resulting from the absolute steering angle sensor. Since the steering angle sensor 50 of the presently filed embodiment is able to output signals of both types, use of a single piece of the steering angle sensor 50 is suffice to comply with various situations that require both the signals including the output signal, resulting from the relative steering angle sensor, and the output signal resulting from the absolute steering angle sensor.

Further, with such a structure being employed, no need arises for the microcomputer 9 to generate the three-phase pulse signals, enabling computing operation to be executed within shortened time period with a resultant increase in response.

Figure 9:
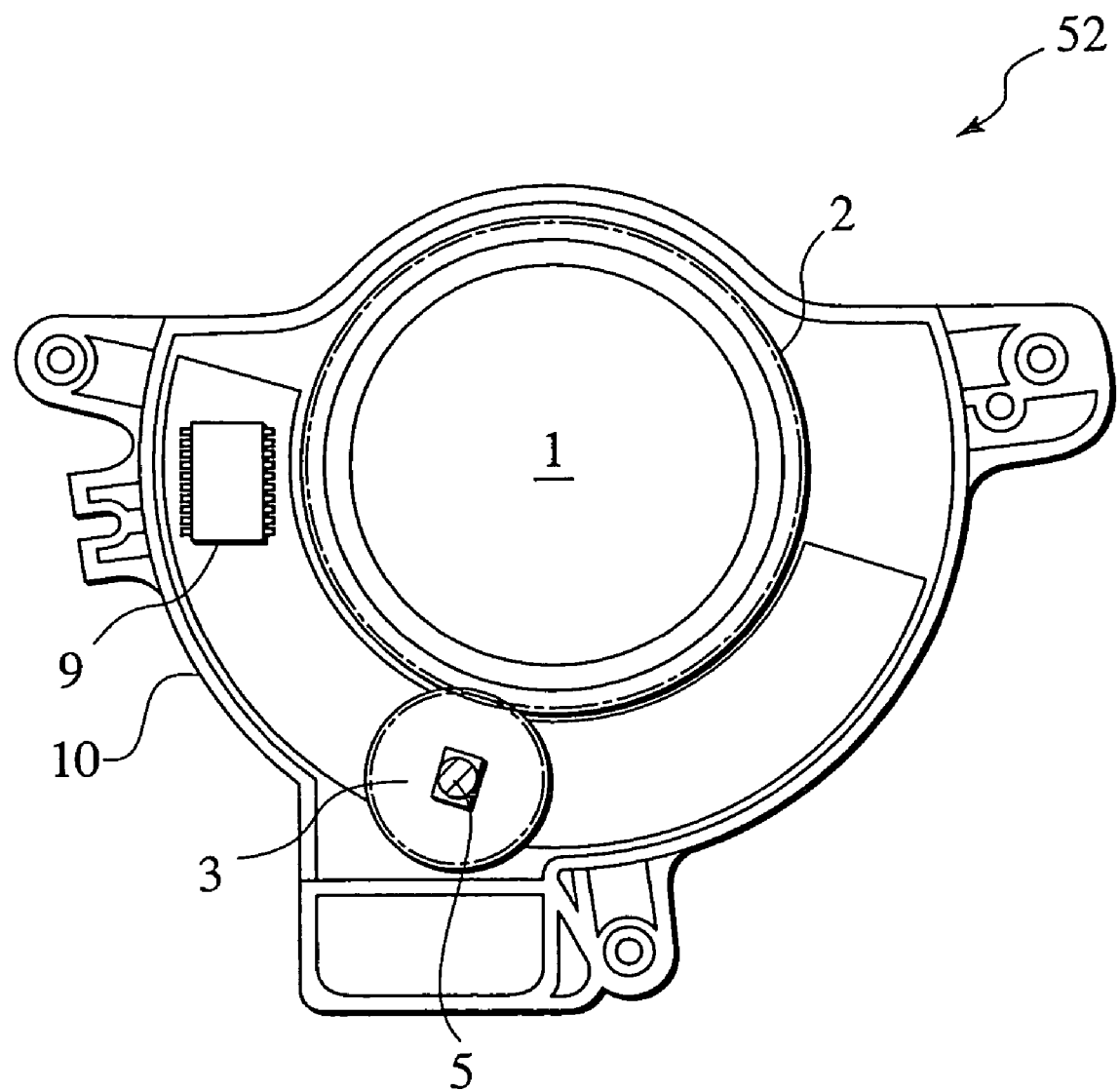
FIG. 9 is a view schematically showing the third embodiment of the present invention.

Next, a third embodiment of the present invention is described. As shown in FIG. 9, a steering angle sensor 52 includes the second gear 3 that is accommodated in the storage case 10, and the second gear 3 is in mesh with the first gear 2 that rotates together with the steering shaft 1.

Mounted to the second gear 3 is the two-pole magnetized magnet 5. As shown in FIG. 2, the magnet sensor 6 is mounted onto the stationary side in opposition to the magnet 5 in the axial direction of the second gear 3. The magnetic sensor 6 operates to detect the rotation angle and rotation direction of the second gear 3 in response to the orientation of the magnetic field generated by the magnet 5, with resulting detected data being outputted.

In addition, the steering angle sensor 52 further includes the microcomputer (control means) 9, which has a function to store and retain the steering angle of the steering shaft 1 as a result of sampling at a given sampling period. The microcomputer 9 calculates the steering angle of the steering shaft 1 again in dependence on the three-phase pulse signals and the absolute angle signal, resulting from subsequent sampling, and stored steering angle data of the steering shaft 1.

With the third embodiment, in an event that the vehicle stands parking or halt with an ignition turned off, the steering angle of the steering shaft 1 can be reliably detected even if the sampling period is set to be long in order to avoid battery runs-out whereby when the ignition is turned on next time to begin running of the vehicle, it is possible to quickly obtain the absolute angle of the steering shaft 1. Like in the first embodiment, by suitably altering the resolution of the rotation angle of the magnet 5, resulting from the magnetic sensor 6, in a value ranging from 6 to 10 bits while keeping the gear ratio between the first gear 2 and the second gear 3 at a fixed value, a desired resolution can be obtained.

Accordingly, since the resolution of the steering angle of the steering shaft 1 can be set to a desired numeric value using the storage case 10 of the same size and the second gear 3 of the same size, no need arises in design change in terms of hardware, enabling reduction in the number of component parts with a resultant simplification in assembling work. Also, it becomes possible to standardize the case, the gears, the magnetic sensors and the magnets to be used in the steering angle sensors shown in the second and third embodiments.

In addition, like in the first embodiment described above, setting the relationship between the output resolution of the A-phase and B-phase pulse signals and the gear ratio to be integer or finite decimal enables detecting precision of the steering angle to be improved. Moreover, it becomes possible for the case, the gears, the magnetic sensors and the magnets to be standardized with those of the steering angle sensors of the second and third embodiments.

As set forth above, while steering angle sensors of the present invention have been described with reference to the embodiments which are shown, no limitation is intended to such structures and in alternative, the structures of various component parts may be replaced with those of arbitrary structures with the same functions.

For instance, while the various embodiments set forth above have been described with reference to an example of the steering shaft 1 to be mounted in the vehicle as the rotary member, the present invention is not limited to such application and may be applied to other rotary bodies.

Moreover, although the A-phase and B-phase pulses have been described as the signals that are deviated in phase at an angle of 90 degrees, the present invention is not limited to such a concept.

The present invention may be embodied in other specific forms without departing from the spirit or essential characteristics thereof. The embodiments are therefore to be considered in all respects as illustrative and not restrictive, the scope of the present invention being indicated by the appended claims rather than by the foregoing description, and all changes which come within the meaning and range of equivalency of the claims are therefore intended to be embraced therein.

What is claimed is:

1. An angle sensor comprising:
a first gear configured to be concentrically mounted to a rotor;
a second gear configured to externally mesh with the first gear; and
a first rotation angle detector configured to detect a rotation angle of the second gear, wherein
the first rotation angle detector outputs absolute angle signals according to the rotation angle of the second gear, generates a first pulse based on rotation of the second gear, generates a second pulse having a different phase compared to the first pulse based on rotation of the second gear, generates a third pulse once per rotation of the second gear based on rotation of the second gear, varies each resolution of rotation angles of the first pulse, the second pulse, and the third pulse, and detects the rotation angle of the second gear in accordance with the resolution.

2. The angle sensor of claim 1, wherein the first rotation angle detector comprises:
a magnetized portion magnetized in alternate magnetic fields; and
a magnetic sensor configured to detect an orientation of magnetic field generated by the magnetized portion.

3. The angle sensor of claim 1, comprising:
a third gear configured to externally mesh with the first gear, and having a different number of gear teeth than the second gear;
a second rotation angle detector configured to detect a rotation angle of the third gear, and transmit absolute angle signals according to the rotation angle of the third gear, and a three-phase pulse signals; and
a controller configured to calculate an absolute rotation angle of the rotor with a combination of the absolute angle signals transmitted by the first rotation angle detector and the absolute angle signals transmitted by the second rotation angle detector.

4. The angle sensor of claim 3, further comprising a controller, wherein the rotor is a steering shaft mounted on a vehicle,
the first rotation angle detector is configured to detect the rotation angle of the second gear at a longer sampling period when an ignition of the vehicle is turned off than a sampling period when the ignition is turned on, and
the controller calculates an absolute rotation angle of the rotor with one of a combination of the first pulse, the second pulse and the third pulse, and the absolute angle signals transmitted by the first rotation angle detector.

5. The angle sensor of claim 1, wherein the first rotation angle detector is configured to vary the resolution of the first pulse in a range from 6 bits to 10 bits.

6. The angle sensor of claim 1, wherein the first rotation angle detector is configured to set the resolution of the first pulse so that a minimum rotation angle in accordance with the resolution can be one of an integer degree and finite decimal degree.

7. The angle sensor of claim 1, wherein the phase difference between the first pulse and the second pulse is 90 degrees.

8. The angle sensor of claim 2, wherein;
the second gear is mounted in parallel to the first gear;
the magnetized portion is axially mounted and disposed central to the second gear axis; and
the magnet sensor is fixedly disposed opposite the magnetized portion in the axial direction.

* * * * *